United States Patent
McTier et al.

(10) Patent No.: US 7,588,231 B2
(45) Date of Patent: Sep. 15, 2009

(54) LOW EMISSION, FIXED MAXIMUM LIQUID LEVEL GAUGE AND VALVE

(75) Inventors: Samuel E. McTier, Lake Forest, IL (US); Jack Glandon, Fresno, CA (US)

(73) Assignee: Propane Technologies LLC, Lake Forest, IL (US)

( * ) Notice: Subject to any disclaimer, the term of this patent is extended or adjusted under 35 U.S.C. 154(b) by 183 days.

(21) Appl. No.: 11/669,534

(22) Filed: Jan. 31, 2007

(65) Prior Publication Data

US 2008/0178670 A1 Jul. 31, 2008

(51) Int. Cl.
*F16K 31/44* (2006.01)
(52) U.S. Cl. .................. 251/266; 251/215; 137/588; 137/592
(58) Field of Classification Search .................. 251/215, 251/264, 357; 137/588, 592, 558, 577
See application file for complete search history.

(56) References Cited

U.S. PATENT DOCUMENTS

| | | | | |
|---|---|---|---|---|
| 2,540,699 A | * | 2/1951 | St Glair | 220/86.1 |
| 2,677,526 A | * | 5/1954 | Johnson | 251/275 |
| 3,058,719 A | * | 10/1962 | Beebee | 251/273 |
| 3,111,141 A | * | 11/1963 | Hughes | 137/630.22 |
| 3,188,865 A | * | 6/1965 | Frost et al. | 73/304 R |
| 3,685,533 A | * | 8/1972 | Krechel | 137/115.05 |
| 3,981,324 A | * | 9/1976 | Waring | 137/556.6 |
| 5,673,736 A | | 10/1997 | Farkas | |
| 6,230,737 B1 | * | 5/2001 | Notaro et al. | 137/329.4 |
| 6,453,933 B1 | * | 9/2002 | Oi et al. | 137/242 |
| 6,497,145 B1 | * | 12/2002 | Ross, Jr. | 73/305 |
| 6,502,461 B2 | | 1/2003 | Keller | |
| 6,766,688 B2 | | 7/2004 | O'Shea | |
| 6,910,499 B2 | | 6/2005 | Chan | |

* cited by examiner

*Primary Examiner*—John K Fristoe, Jr.
*Assistant Examiner*—Marina Tietjen
(74) *Attorney, Agent, or Firm*—Cook Alex Ltd.

(57) ABSTRACT

A valve for substantially reducing emissions from a level gauge. A lower end of the valve fits in a first interior cavity of the level gauge, which is in gaseous communication with an emission limiting bore in the level gauge. A second internal cavity is defined in said valve body and a seat is disposed near the bottom of the second internal cavity. A bore of substantially reduced cross-sectional area is disposed in the lower end of the valve body and is in gaseous communication with the second internal cavity A thumbscrew opens and closes the valve at the seat. An orifice vents gas or liquid from the second internal cavity when the thumbscrew is off of the seat. A low emissions level gauge and related methods are also disclosed.

13 Claims, 5 Drawing Sheets

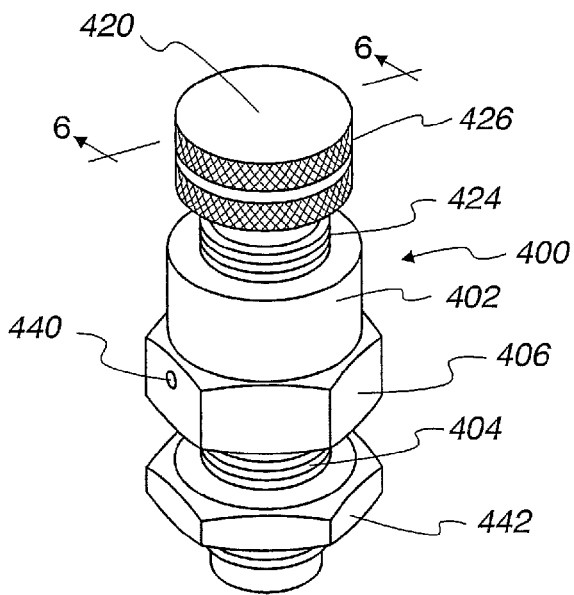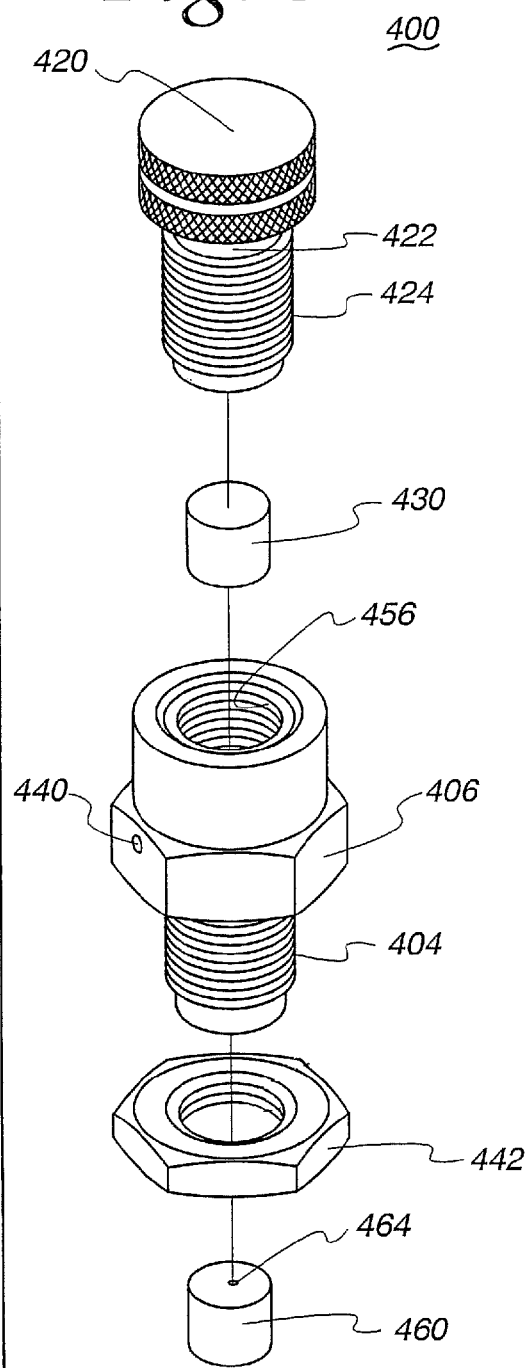

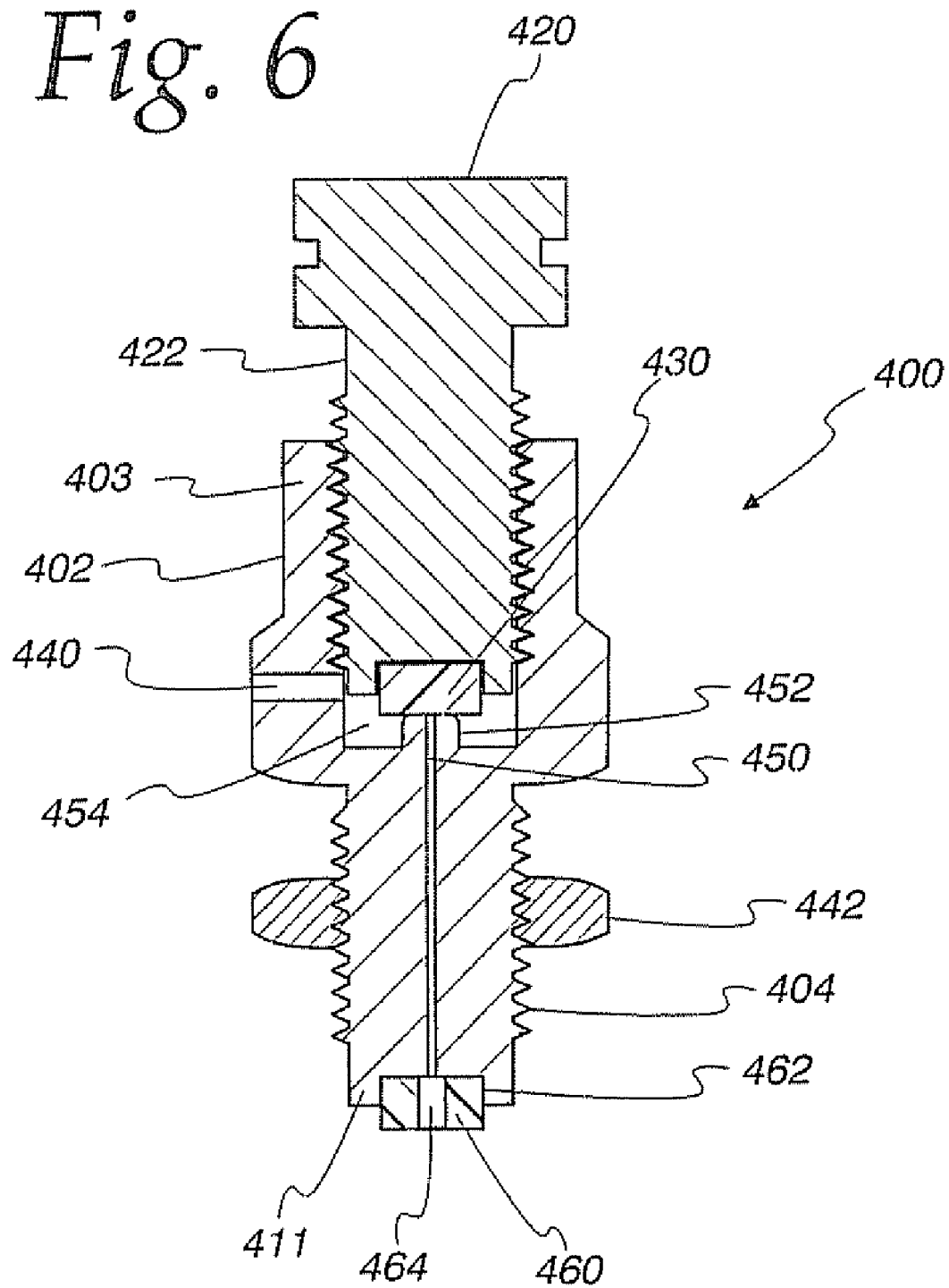

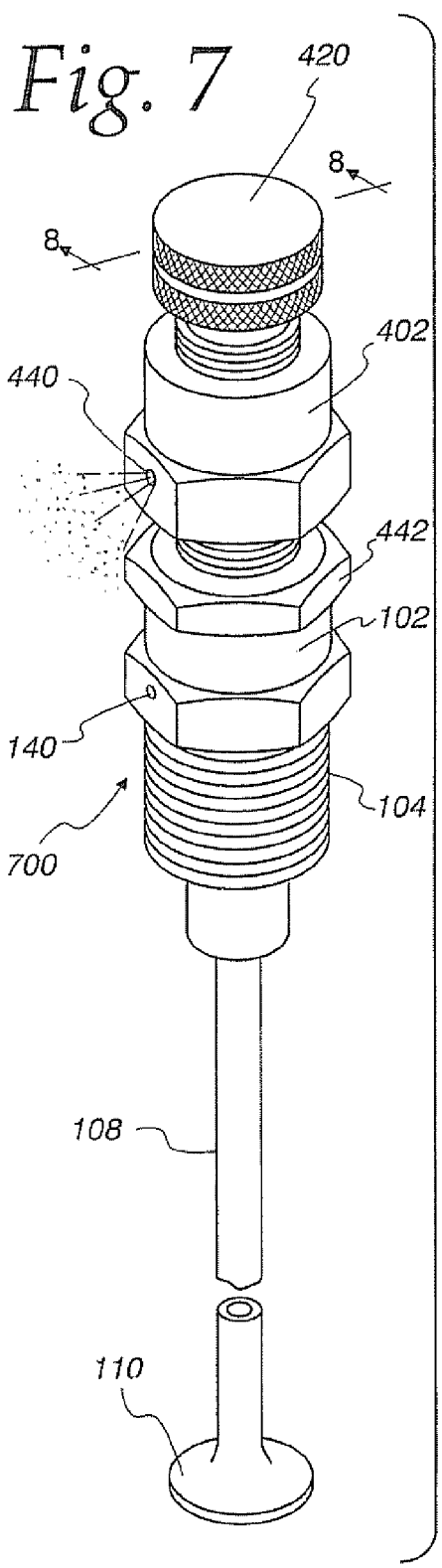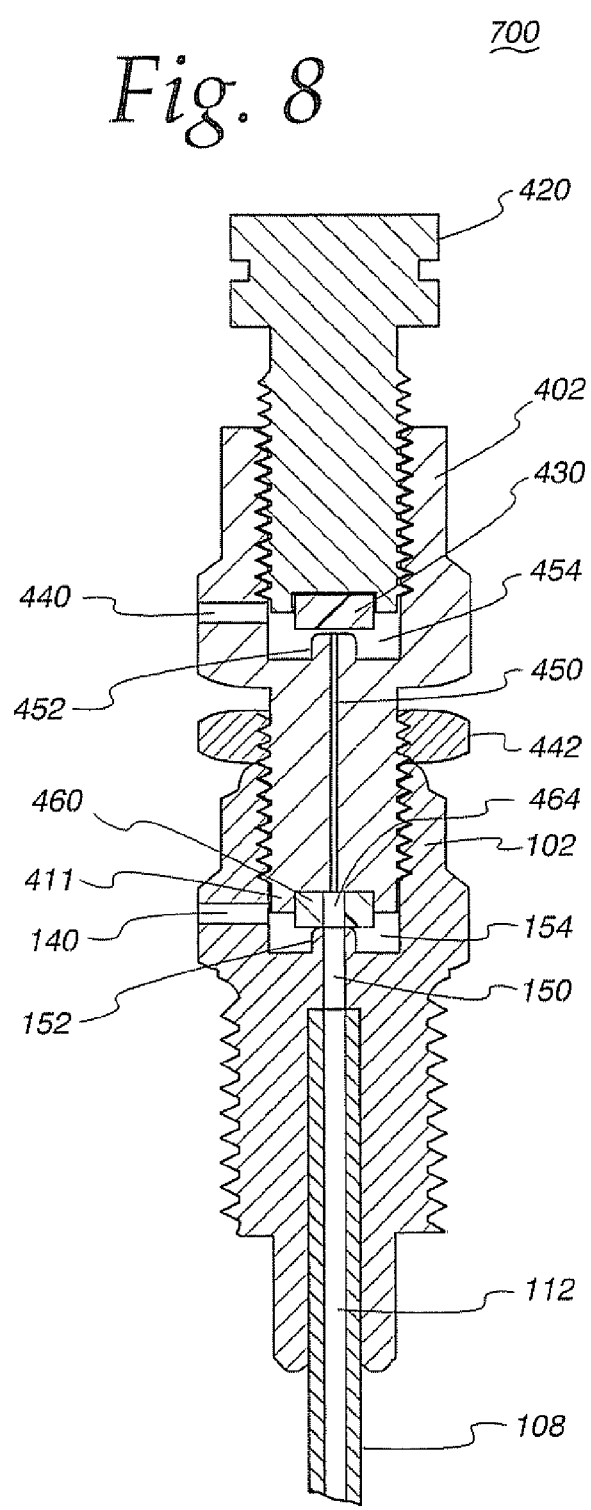

LOW EMISSION, FIXED MAXIMUM LIQUID LEVEL GAUGE AND VALVE

FIELD OF THE INVENTION

The present invention relates generally to level gauges, such as are used on vessels for containing pressurized gases or liquids More particularly, the present invention relates to an improved fixed liquid level gauge which substantially reduces emissions while refilling the vessel, and to an adapter for retrofitting existing level gauges to also substantially reduce emissions.

BACKGROUND OF THE INVENTION

Many vessels are suited for refilling when the gas or liquid within the tank is depleted. One such example is a propane tank. Fixed maximum liquid level gauges are currently used on propane tanks to assist in refilling of the tank, such as when the tank is refilled with a filling hose. Such gauges are employed to avoid overfilling of the tank. Typically, these liquid level gauges have a tube which extends downwardly into the tank to a predetermined, or to a fixed depth from the top of the tank.

As the propane tank is being refilled, the liquid level within the tank rises until it comes into contact with the bottom end of the tube. When the liquid propane comes into contact with the bottom end of the tube, liquid propane is pushed up into the tube, through an emission limiting bore in the level gauge, and begins to discharge through a bleeder valve in the fixed liquid level gauge. As the liquid propane discharges through the bleeder valve portion of the gauge, a mist or cloud is formed, much like a cloud created by the melting of solid carbon dioxide. This indicates to the person filling the tank, that the tank is now full and that the filling process should be terminated. Thus, the fixed liquid level gauge is also a safety device that assists in preventing the overfilling of the tank.

When the filling of the tank is completed, the bleeder valve portion of the fixed liquid level gauge should be closed or shut off to prevent further discharge and loss of the propane fuel However, this discharge of propane fuel during the filling process also emits propane into the air, thereby tending to increase the amount of pollution in the air Certain jurisdictions are particularly desirous of reducing any pollutants and have laws which limit the amount of pollutants which may be emitted into the atmosphere.

There has therefore been a need for an improved fixed liquid level gauge that substantially reduces the amount of gas, such as propane, that is discharged while refilling the tank.

A general object of the present invention is therefore to provide an improved fixed maximum liquid level gauge which substantially reduces the amount of gas discharged into the atmosphere while refilling of a tank.

Another object of the present invention is to provide an adapter for a fixed maximum liquid level gauge that retrofits existing level gauges to also substantially reduce the amount of gas discharged into the atmosphere A further object of the present invention is to provide an improved low emission fixed maximum liquid level gauge which is economical to utilize on tanks Yet another object of the present invention is to provide an adapter or valve for a fixed maximum liquid level gauge which retrofits existing level gauges in an effective and economical manner to substantially reduce emissions.

SUMMARY OF THE INVENTION

The present invention is directed to a valve for substantially reducing emissions from a level gauge. The valve fits into a level gauge which has a first interior cavity which is open when a thumbscrew is open from the level gauge. The first interior cavity of the level gauge is in gaseous communication with an emission limiting bore in the level gauge. The valve includes a valve body with a threaded lower end, the lower end adapted to fit into the interior cavity of the level gauge when the thumbscrew is removed from the valve body. A second internal cavity is defined in the valve body and a seating area disposed near the bottom of the second internal cavity. A bore is disposed in the lower end of the valve body; the bore in the valve body being of substantially reduced cross-sectional area compared to the emission limiting bore in the level gauge. This bore in the valve body provides gaseous communication between the lower end of the valve body and the second internal cavity. Means is provided for opening and closing the valve by permitting, or by not permitting, gaseous communication between the bore and the second internal cavity. An orifice extends between the second internal cavity and an exterior surface of the valve body to vent gas or liquid from the second internal cavity when the means for opening or closing the valve permits gaseous communication between the bore and the second internal cavity.

The bore disposed in the lower end of the valve body preferably has a diameter of 0.025 inches, or less. The means for opening and closing the valve may comprise a thumbscrew. A seat may be disposed at the bottom of the second internal cavity and resilient means may be disposed on the bottom end of the thumbscrew to contact the seat when the thumbscrew is in a closed condition, thereby preventing gaseous communication between the second internal cavity and the bore.

The present invention is also directed to methods for retrofitting a level gauge with a low emission valve to substantially reduce emissions from the level gauge. The method includes the steps of removing the thumbscrew from the level gauge, fitting a lower end of the valve into the interior cavity of the level gauge, defining a second internal cavity in the valve, disposing a seating area near the bottom of the second internal cavity, disposing a bore in the lower end of the valve with the bore being of substantially reduced cross-sectional area compared to an emission limiting bore in the level gauge, the bore in the valve body providing gaseous communication between the lower end of the valve body and the second internal cavity, providing means for opening and closing the valve by permitting, or by not permitting, gaseous communication between the bore and the second internal cavity, and extending an orifice between the second internal cavity and an exterior surface of the valve to vent gas or liquid from the second internal cavity when the means for opening or closing the valve permits gaseous communication between the bore and the second internal cavity.

Further steps of the methods may include limiting the bore to a diameter of 0.025 inches, or less, providing a thumbscrew as the means for opening and closing the valve, disposing a seat at the bottom of the second internal cavity, and disposing resilient means on a bottom end of the thumbscrew to contact the seat when the thumbscrew is in a closed condition, thereby preventing gaseous communication between the second internal cavity and the bore.

The present invention is further concerned with a level gauge for reducing emissions from a vessel, the level gauge includes a valve body with a threaded lower end, the lower end adapted to attach the level gauge to the vessel, a tube extending from the lower end of the level gauge into the vessel, the tube having a passageway extending therethrough, an internal cavity defined in the valve body, a seating area disposed near the bottom of the internal cavity, a bore disposed in the lower end of the valve body, the bore in the valve body being of substantially reduced cross-sectional area compared to the cross-sectional area of an emission limiting bore in the level gauge, the bore in the valve body providing gaseous communication between the emission limiting bore of the level gauge and the internal cavity, means for opening and closing the valve by permitting, or by not permitting, gaseous communication between the bore and the second internal cavity, and an orifice extending between the internal cavity and an exterior surface of the valve body to vent gas or liquid from the internal cavity when the means for opening or closing the valve permits gaseous communication between the bore and the second internal cavity Preferably, the diameter of the bore in the valve body is about 0.025 inches, or less The means for opening and closing the valve may be a thumbscrew A seat may be disposed at the bottom of the second internal cavity, and resilient means may be disposed on a bottom end of the thumbscrew to contact the seat when the thumbscrew is in a closed condition, thereby preventing gaseous communication between the second internal cavity and the bore.

BRIEF DESCRIPTION OF THE DRAWINGS

The invention, together with its objects and the advantages thereof, may best be understood by reference to the following description taken in conjunction with the accompanying drawings, in which like reference numerals identify like elements in the figures, and in which:

FIG. 4 is a perspective view of a valve for the fixed maximum level gauge illustrated in FIGS. 1-3 in accordance with the present invention;

FIG. 5 is an exploded perspective view of the valve shown in FIG. 4 in accordance with the present invention;

FIG. 6 is a cross-sectional view of the valve shown in FIGS. 4 and 5 in accordance with the present invention, with the cross-section taken along section lines 6-6 in FIG. 4;

FIG. 7 is a perspective view of the valve shown in FIGS. 4-6 mounted in the fixed maximum level gauge of FIGS. 1-3 to provide an improved low emission level gauge in accordance with the present invention; and FIG. 8 is a cross-sectional view of the low emission level gauge shown in FIG. 7 in accordance with the present invention.

DESCRIPTION OF THE PREFERRED EMBODIMENTS

It will be understood that the invention may be embodied in other specific forms without departing from the spirit thereof. The present examples and embodiments, therefore, are to be considered in all respects as illustrative and not restrictive, and the invention is not to be limited to the details given herein.

Figure 1:
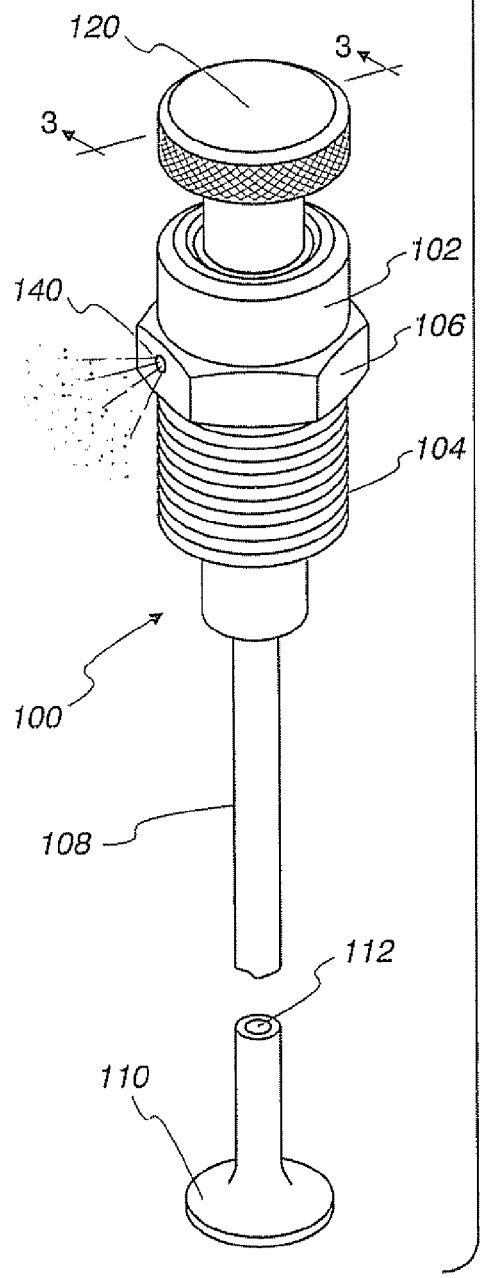
FIG. 1 is a perspective view illustrating a prior art fixed maximum liquid level gauge.
Figure 2:
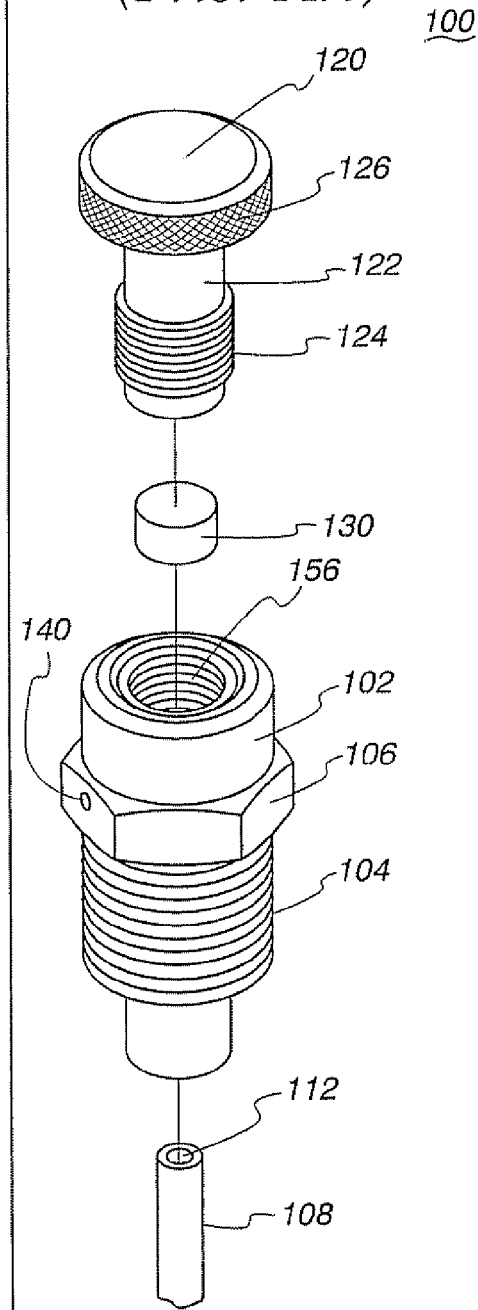
FIG. 2 is an exploded perspective view of the prior art fixed maximum level gauge of FIG, 1.
Figure 3:
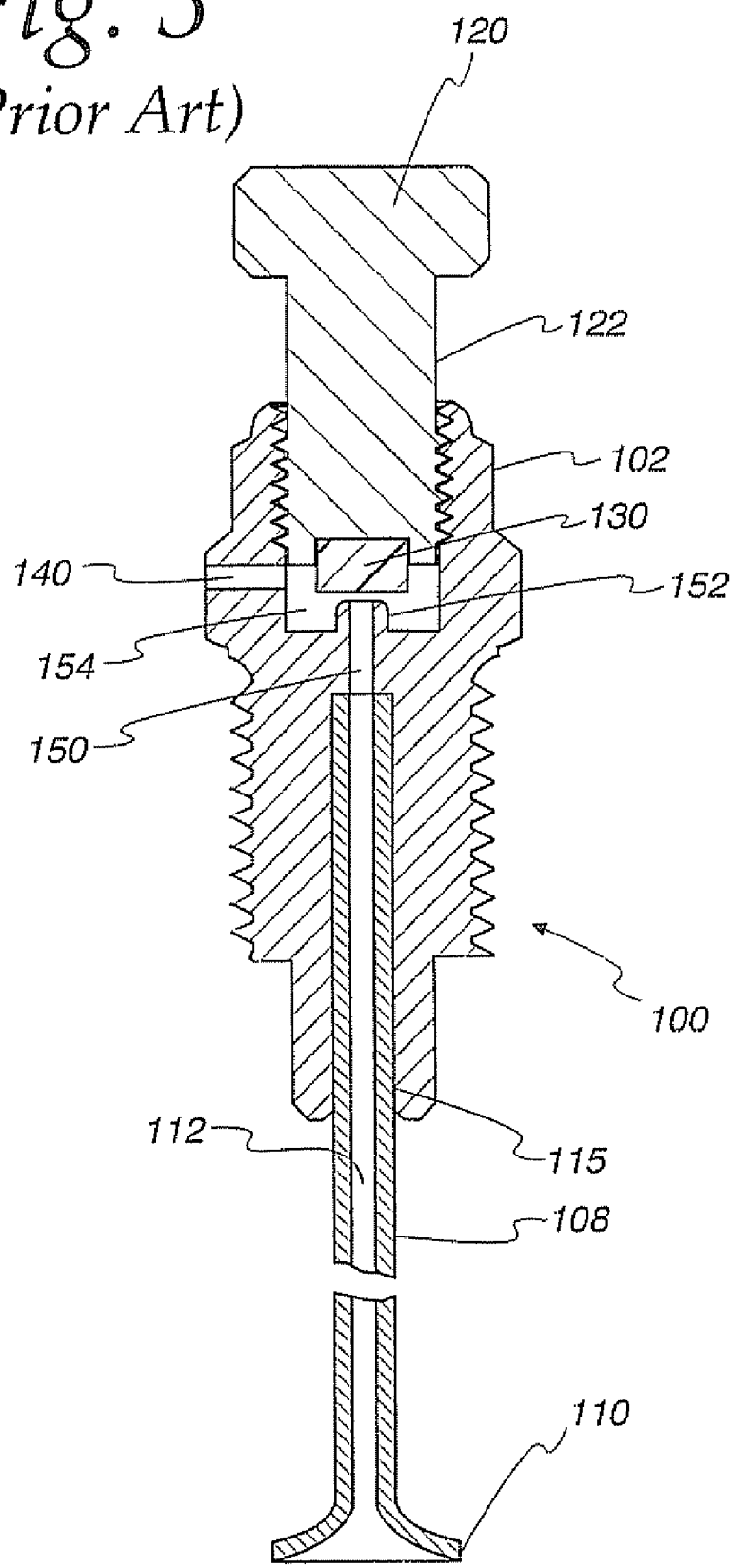
FIG. 3 is a cross-sectional view of the fixed maximum level gauge shown in FIGS. 1 and 2, with the cross-section taken along section lines 3-3 in FIG. 1.

With reference to the drawing Figures, FIGS. 1-3 illustrate a prior art fixed maximum liquid level gauge, generally designated 100. Level gauge 100 includes a valve body 102, which may have a lower treaded portion 104 and an intermediate or upper hexagonal portion 106 for use with a tool to tighten the threaded portion when the level gauge 100 is to be installed on a gaseous or liquid vessel.

Extending downwardly from the valve body 102 is a tube 108. A distal end 110 of the tube 108 may be flared to a larger diameter, which provides for quicker filling of the tube 108 when the liquid in the associated vessel reaches the bottom of tube 109. Tube 108 has a central passageway 112 extending generally axially through the tube, from the distal end 110 to the valve body 102. The length of tube 108 may vary depending upon the application and the size of the vessel used with the level gauge 100. For example, the length of tube 108 is generally sized such that the distal end will engage the fluid in the vessel when the vessel is about 80 percent full. For a typical 20 pound propane tank, tube 108 would be about 4 inches (about 10 cm) long. This provides expansion room in the unfilled portion of the tank for the liquid contained in the tank as the ambient temperature varies.

In a manner known to the art, the level gauge 100 is installed on a gaseous or liquid vessel by inserting the tube 108 into the vessel until the threaded portion 104 of the valve body 102 contacts a corresponding female connector which is affixed to the vessel. Tube 108 then extends, usually downwardly, into the vessel That portion of valve body 102 above the treaded portion 104 is then outside of the vessel and may be utilized and monitored as further described below.

As seen in FIG. 3, the lower end of valve body 102 has an axial bore 115 extending upwardly into the valve body. Bore 115 may be sized to receive the upper end of tube 108 therein, such as in an interference fit for retaining tube 108 in valve body 102. Valve body 102 has an emission limiting bore 150, which extends between the end of tube 108 and an interior cavity 154 in valve body 102. Bore 150 is typically a number 54 drill size, which is equivalent to about 0.055 inches or about 1.8 mm. Bore 150 thus provides for gaseous and/or liquid communication between tube 108 and interior cavity 154, but limits the amount of gas or liquid which may pass through the level gauge when the thumb screw 120 is in an open position. In the example of FIG. 3, a raised area about the upper end of bore 150 provides a seat 152 about the bore 150.

As best seen in FIGS. 2 and 3, the upper end of valve body 102 has threads 156 in the interior cavity for receiving complementary threads 124 about a shank portion 122 of a thumb screw 120. For ease of use, thumb screw 120 may have a knurled outer surface 126. A cylinder 130 of resilient or semi-resilient material is inserted into the bottom of thumb screw 120 such that cylinder 130 is disposed above the seat 152 when the thumb screw 120 is screwed into the interior cavity 154 of valve body 102.

Normally, thumb screw 102 is turned tight in valve body 102 such that the resilient material 130 at the bottom of the thumb screw is in contact with the seat 152 of valve body 102, thereby preventing gaseous or liquid communication between tube 108 and the interior cavity 154. However, during refilling of the vessel associated with level gauge 100, the thumb screw 120 is backed off of the seat 152, as shown in FIG. 3. Some gas or liquid, such as propane, is then discharged through tube 108, through the emission limiting bore 150, into interior cavity 154 and out of orifice 140 into the surrounding atmosphere.

As the vessel is being filled, the propane is compressed at a pressure in which it assumes a liquid state. When the liquid propane reaches the distal end 110 of tube 108, liquid propane is forced up tube 108, up emission limiting bore 150, and into interior cavity 154, and out of orifice 140, into the surrounding atmosphere. Many gases, including propane, are invisible. However, the immediate evaporation of the liquid propane into the atmosphere at the orifice 140 causes cooling of moisture in the atmosphere which forms a cloud near orifice 140. This provides a visual indication to the person filling the vessel that the vessel is now filled to its recommended capacity.

While the foregoing prior art level gauge 100 works well for its intended purpose, there are ever increasing concerns about the amount of pollution created by many sources, including the filling of propane tanks and the like, In accordance with one aspect of the present invention, a valve 400, for retrofitting the prior art fixed maximum level gauge 100 of FIGS. 1-3 to substantially reduce undesired emissions, is illustrated in FIGS. 4-6. Valve 400 includes a valve body 402, which may have a treaded portion 404 at a lower end 411 and an intermediate or upper hexagonal portion 406.

As seen in FIG. 6, the lower end 411 of valve body 402 has an axial bore 462 extending upwardly into the valve body. Bore 462 may be suited to receive a plug 460 of resilient material therein. Preferably, plug 460 has a bore 464 extending axially through the plug. Bore 464 is preferably larger than bore 450 extending between plug 460 and the interior cavity 454 of valve body 402. Bores 450 and 464 thus provide for gaseous and/or liquid communication between the bottom end 411 of valve 400 and its interior cavity 454. A raised area about the upper end of bore 450 provides a seat 452 about the bore 450.

As mentioned above, valve body 402 has an intermediate bore 450, which extends between the upper end of plug 460 and an interior cavity 454 in valve body 402. Bore 450 is typically a number 72 drill size, or smaller, which is equivalent to about 0.025 inches or about 0.8 mm. It will be appreciated that the cross-sectional area of bore 450 is related to the square of the diameter. Thus, the area of bore 450 in valve 400 is about one-fifth of the cross-sectional area of the bore 150 of the prior art level gauge 100 in FIG. 3. This means that the amount of gas or liquid that will be released through valve 400 during refilling procedures will be five times less than the amount of gas that will be released through the prior art level gauge 100. Bore 450 is therefore more restrictive to the passage of gas or liquid therethrough than bore 150. Of course if the size of bore 450 in valve 400 is made even smaller than 0.8 mm, correspondingly less gas or liquid will be emitted by the valve 400 as compared to the level gauge 100. In the example shown in FIG. 6, bore 464 in the resilient material of plug 460 is considerably larger than the bore 450. However, the sizes of bores 450 and 464 could be reversed if desired.

As best seen in FIGS. 5 and 6, the upper end 403 of valve body 402 has threads 456 in the interior cavity 454 for receiving complementary threads 424 about a shank portion 422 of a thumb screw 420. For ease of use, thumb screw 420 may have a knurled outer surface 426 A cylinder 430 of resilient or semi-resilient material is inserted into the bottom of thumb screw 420 such that cylinder 430 is disposed above the seat 452 when the thumb screw 420 is screwed into the interior cavity 454 of valve body 402. A lock nut 442 may be disposed on the threads 404 at the lower end 411 of valve 400.

Thus, when thumb screw 402 is turned tight in valve body 402, as shown in FIG. 6, the resilient material 430 at the bottom of the thumb screw is in contact with the seat 452 of valve body 402, thereby preventing gaseous or liquid communication between the bottom end 411 of valve 400 and the interior cavity 454. However, during refilling of the vessel associated with valve 400, the thumb screw 420 is backed off of the seat 452. Some gas or liquid, such as propane, is then discharged through bore 464, bore 450, interior cavity 454 and orifice 440 into the surrounding atmosphere.

FIGS. 7 and 8 illustrate the retrofitting of a prior art level gauge 100 shown in FIGS. 1-3 with the valve 400 shown in FIGS. 4-6, to provide an improved low emission level gauge 700 in accordance with the present invention. When thumb screw 120 (FIGS. 1-3) of level gauge 100 is removed, the lower end 411 of valve body 402 of valve 400 (FIGS. 4-6) may be threaded into the inner cavity 154 of level gauge 100. Valve body 402 is then effectively piggybacked onto valve body 102. Locknut 442 may then be tightened against valve body 102 to firmly retain valve body 402 in valve body 102.

When valve body 402 is fully inserted into valve body 102, resilient plug 460 comes to rest against the seat 152, thereby preventing any gas or liquid in passageway 112 from escaping through orifice 140. Instead, any gas or liquid in the level gauge 100 is now redirected through the significantly smaller bore 450 in valve body 402. If thumbscrew 420 is away from seat 452, as shown in FIG. 8, the gas or liquid will continue through bores 464 and 450, into internal cavity 454 and then be released through orifice 440. Thus, the smaller cross-sectional area of bore 450 in valve body 402, than that of the emission limiting bore 150 in level gauge 100, will substantially reduce the amount of gas or liquid released into the atmosphere at orifice 440.

It will be appreciated that, due to the fineness of bore 450, that it may occasionally become blocked by dust or dirt carried by the gas or liquid. In such instances, the valve 400 may be removed from the level gauge 700. Valve 400 may then be replaced by another valve. Replacement or reworking of valve 400 may, thus, be more economical than replacing the entire level gauge 700. Of course, it may also be impractical and dangerous to remove the level gauge from the tank when the tank still has pressurized gas and/or liquid remaining in it.

While particular embodiments of the invention have been shown and described, it will be obvious to those skilled in the art that changes and modifications may be made therein without departing from the invention in its broader aspects,

The invention claimed is:

1. A valve for reducing emissions from a level gauge, said valve adapted to fit onto a level gauge for a vessel, said level gauge having a first interior cavity which is open when a thumbscrew is removed from the level gauge, said first interior cavity of the level gauge being in gaseous communication with an emission limiting bore in the level gauge, said valve comprising:

a valve body with a threaded lower end, said lower end adapted to fit into said interior cavity of the level gauge when said thumbscrew is removed from the valve body to attach the valve to the level gauge;

a second internal cavity defined in said valve body;

a seating area disposed near the bottom of the second internal cavity;

a bore disposed in the lower end of said valve body, said bore in the valve body being of substantially reduced cross-sectional area compared to the cross-sectional area of an emission limiting bore in the level gauge, said bore in the valve body providing gaseous communication between the lower end of the valve body and the second internal cavity;

means for opening and closing said valve by permitting, or by not permitting, gaseous communication between said bore in the valve body and said second internal cavity;

an orifice extending between said second internal cavity and an exterior surface of said valve body to vent gas or liquid from the second internal cavity when the means for opening or closing said valve permits gaseous communication between the bore in the valve body and the second internal cavity;

means for blocking at least a portion of the venting passageway in the level gauge to prevent emissions from venting through the level gauge; and means for redirecting the emissions normally vented through the level gauge through a more restrictive bore in the valve body, thereby substantially reducing emissions from the level gauge while refilling the vessel.

2. The valve for reducing emissions from a level gauge in accordance with claim 1, wherein said bore has a diameter of 0.025 inches, or less.

3. The valve for reducing emissions from a level gauge in accordance with claim 1, wherein the means for opening and closing said valve is a thumbscrew.

4. The valve for reducing emissions from a level gauge in accordance with claim 3, said valve further comprising;

a seat disposed at the bottom of the second internal cavity; and resilient means disposed on a bottom end of said thumbscrew to contact said seat when the thumbscrew is in a closed condition, thereby preventing gaseous communication between the second internal cavity and the bore.

5. A method of retrofitting a level gauge for a vessel with a low emission valve to substantially reduce emissions from the level gauge, said level gauge having a first interior cavity which is exposed when a thumbscrew is removed from the level gauge, said first interior cavity of the level gauge being in gaseous communication with an emission limiting bore in the level gauge, said method comprising the steps of:

removing the thumbscrew of the level gauge;

fitting a lower end of the valve into the interior cavity of the level gauge to attach the valve to the level gauge;

defining a second internal cavity in said valve;

disposing a seating area near the bottom of the second internal cavity;

disposing a bore in the lower end of said valve, said bore being of substantially reduced cross-sectional area compared to the cross-sectional area of an emission limiting bore in the level gauge, said bore in the valve providing gaseous communication between the lower end of the valve and the second internal cavity;

providing means for opening and closing said valve by permitting, or by not permitting, gaseous communication between said bore and said second internal cavity;

extending an orifice between said second internal cavity and an exterior surface of said valve to vent gas or liquid from the second internal cavity when the means for opening or closing said valve permits gaseous communication between the bore and the second internal cavity;

blocking at least a portion of the venting passageway in the level gauge to prevent emissions from venting through the level gauge;

redirecting the emissions normally vented through the level gauge on the vessel through a more restrictive bore in the valve body, thereby substantially reducing the emissions from the level gauge.

6. The method of retrofitting a level gauge in accordance with claim 5, said method comprising the further step of:

limiting said bore in the valve to a diameter of 0.025 inches, or less.

7. The method of retrofitting a level gauge in accordance with claim 5, said method comprising the further step of:

providing a thumbscrew as the means for opening and closing said valve.

8. The method of retrofitting a level gauge in accordance with claim 7, said method comprising the further steps of:

disposing a seat at the bottom of the second internal cavity; and disposing resilient means on a bottom end of said thumbscrew to contact said seat when the thumbscrew is in a closed condition, thereby preventing gaseous communication between the second internal cavity and the bore.

9. A valve body for a vessel for substantially reducing emissions normally vented through a level gauge having a venting passageway, said valve body comprising:

means for attaching said valve body to said level gauge;

a second internal cavity defined in said valve body;

a seating area disposed near the bottom of the second internal cavity;

a bore disposed in the lower end of said valve body, said bore being of substantially reduced cross-sectional area compared to the cross-sectional area of an emission limiting bore in the level gauge, said bore in the valve body providing gaseous communication between the lower end of the valve body and the second internal cavity;

means for opening and closing said valve by permitting, or by not permitting, gaseous communication between said bore and said second internal cavity;

an orifice extending between said second internal cavity and an exterior surface of said valve body to vent gas or liquid from the second internal cavity when the means for opening or closing said valve permits gaseous communication between the bore and the second internal cavity;

means for blocking at least a portion of the venting passageway in the level gauge to prevent emissions from venting through the level gauge; and means for redirecting the emissions normally vented through the level gauge on the vessel through a more restrictive bore in the valve body, thereby substantially reducing emissions from the level gauge.

10. The valve body in accordance with claim 9, means for attaching said valve body to said level gauge comprising:

a threaded lower end, said threaded lower end adapted to fit into an interior cavity of the level gauge.

11. The valve body in accordance with claim 9, wherein said bore in the valve body has a diameter of 0.025 inches, or less.

12. The valve body in accordance with claim 9, wherein the means for opening and closing said valve is a thumbscrew.

13. The valve body in accordance with claim 9, said valve body further comprising;

a seat disposed at the bottom of the second internal cavity; and resilient means disposed on a bottom end of said thumbscrew to contact said seat when the thumbscrew is in a closed condition, thereby preventing gaseous communication between the second internal cavity and the bore in the valve body.

* * * * *